United States Patent
Peisner

(10) Patent No.: US 6,684,165 B2
(45) Date of Patent: Jan. 27, 2004

(54) APPARATUS AND METHOD FOR MONITORING FORCE, ESPECIALLY FORCE IN LABOR AND DELIVERY

(76) Inventor: David B. Peisner, 5376 Glen Harbor Dr., Kalamazoo, MI (US) 49009-9535

( * ) Notice: Subject to any disclaimer, the term of this patent is extended or adjusted under 35 U.S.C. 154(b) by 24 days.

(21) Appl. No.: 09/950,736

(22) Filed: Sep. 13, 2001

(65) Prior Publication Data

US 2002/0099509 A1 Jul. 25, 2002

Related U.S. Application Data

(60) Provisional application No. 60/263,751, filed on Jan. 25, 2001.

(51) Int. Cl.[7] .............................. G01L 1/00; G01D 7/00
(52) U.S. Cl. ..................... 702/41; 702/138; 702/139; 73/862.041; 73/862.042; 73/862.043; 73/862.381; 73/862.61; 600/587
(58) Field of Search .................... 702/41, 138, 139; 73/862.041, 862.042, 862.043, 862.381, 862.61; 600/587

(56) References Cited

U.S. PATENT DOCUMENTS

| | | | | |
|---|---|---|---|---|
| 4,366,715 A | * | 1/1983 | Bradshaw | 73/714 |
| 5,099,702 A | * | 3/1992 | French | 73/862.68 |
| 5,400,661 A | * | 3/1995 | Cook et al. | 73/862.043 |
| 6,132,382 A | * | 10/2000 | Archibald et al. | 600/485 |

OTHER PUBLICATIONS

Robert Allen, et al., "Risk Factors for Shoulder Dystocia: An Engineering Study of Clinician–Applied Forces", Obstetrics & Gynecology, vol. 77, No. 3, Mar. 1991, pp. 352–355.
Robert Allen, et al., "Comparing Clinician–Applied Loads for Routine, Difficult and Shoulder Dystocia Deliveries", American Journel of Obstetrics and Gynegology, Dec. 1994, pp. 1621–1627.
Bernard Gonik, et al., "Mathematic Modeling of Forces Associated with Shoulder Dystocia: A Comparison of Endogenous and Exogenous Sources", American Journel of Obstetrics and Gynecology, Mar. 2000, pp. 689–691.

* cited by examiner

Primary Examiner—John Barlow
Assistant Examiner—Meagan S. Walling
(74) Attorney, Agent, or Firm—Birch, Stewart, Kolasch & Birch, LLP

(57) ABSTRACT

An apparatus for monitoring a force applied to an object by a person includes a support upon which the person stands, and one or more force sensors for detecting the reaction force applied through the person to the support resulting from the application of force to the object. A computing accessory may be included for computing the magnitude of the force, and a display for the result or other output devices may also be provided. A method of monitoring force is also disclosed. The apparatus and method may be used to determine the amount of force applied to an infant during delivery. The apparatus and method may also be used for a broad range of applications requiring measurement of applied force.

41 Claims, 7 Drawing Sheets

APPARATUS AND METHOD FOR MONITORING FORCE, ESPECIALLY FORCE IN LABOR AND DELIVERY

CROSS-REFERENCE TO RELATED APPLICATION

This application claims the benefit under 35 U.S.C. § 119(e) of U.S. Provisional application Ser. No. 60/263,751 filed on Jan. 25, 2001 entitled "APPARATUS AND METHOD FOR MONITORING FORCE OF LABOR AND DELIVERY", the entire contents of which are incorporated by reference herein.

BACKGROUND OF THE INVENTION

1. Field of the Invention

This invention relates generally to an apparatus and method used in connection with monitoring reaction forces such as those associated with the application of tension, traction, or torque. The invention is particularly applicable to the direct measurement of such forces exerted on an infant during delivery.

2. Description of the Related Art

There has never been an easy or practical way to directly measure the forces that are exerted on an infant as he/she is delivered in the birth process. Since, for example, the maternal pelvis can cause some obstruction when the baby is delivered, the obstetrician often has to exert some external force on the infant to complete the delivery. As a baby emerges from the mother's pelvis, the obstetrician often must pull on the baby's head to deliver the shoulders and, eventually, the rest of the body. If the shoulders are broad and/or the body is large, a substantial amount of force may be necessary to complete the delivery. If the obstetrician applies too great a force, it is possible to cause injury, such as a tearing of nerves in the baby's neck or shoulder. Such injuries may result in, i.e., permanent paralysis of part of the shoulder, arm and/or hand. There has been no simple or practical device for monitoring the force applied in delivering an infant, and there have been only scattered attempts to measure, either directly or indirectly, such a force in an experimental situation.

There have been attempts to measure such forces indirectly with special gloves (H. Allen et al., "Risk Factors for Shoulder Dystocia: An Engineering study of Clinician-Applied Forces", Obstet. Gynecol., 77:352, 1991), a mechanical model (R. H. Allen et al., "Comparing Clinician-Applied Loads for Routine, Difficult, and Shoulder Dystocia Deliveries", Am. J. Obstet. Gynecol, 171:1621, 1994), and a mathematical model (B. Gonik et al., "Mathematic Modeling of Forces Associated with Shoulder Dystocia: A Comparison of Endogenous and Exogenous Sources", Am. J. Obstet. Gynecol., 182:689, 2000). None of these potential solutions has been widely accepted, primarily because they are not practical or accurate, and have not been able to measure the actual forces that are imposed upon the infant during delivery. The first method above used tactile sensors in gloves worn by the attending obstetrician as the baby was delivered. However, the sensors were not on all fingers, and did not cover the entire hand of the obstetrician. The last two models could only approximate the forces of delivery, and many assumptions were required to be used as the models were created.

Force platforms that measure forces in three orthogonal directions are known, such as shown in U.S. Pat. No. 5,029,483 to Gautschi et al., and U.S. Pat. No. 5,400,661 to Cook et al. However, these platforms and others have been used to measure forces that were applied to the platform for such purposes as analyzing the way a person or animal stands, sways, or walks in controlled situations or in response to specific stimuli. Somewhat similar platforms have been used in sports applications and/or medical applications. Previous platforms have relied on complex sensors that measured three orthogonal forces. Such known sensors were unduly complex.

Availability of a practical delivery monitor would facilitate research to determine how much force is "too much" for a safe birth delivery. Accurately measuring the force applied to a baby during delivery will allow studies to be done to determine the types of forces that may safely be applied and threshold(s) at which injuries may occur, and the various factors that might affect these thresholds, e.g. sex, size and estimated weight of the baby prior to birth, the amount of time a particular force is exerted, etc. Such knowledge, if properly put into use by medical practitioners, could protect infants from injury that could otherwise occur.

A conventional way to measure force (weight) is by use of a scale. There are several ways that conventional scales are built. Many are purely mechanical. A modern electronic scale may use, for example, a strain transducer which changes its electrical conductivity or generates a small voltage due to imposed strain or a piezoelectric effect. This can be measured based on the degree to which the transducer is compressed, stretched or stressed. When one side of such a transducer is attached to a stable platform on the bottom of the scale and the other side is attached to a movable top of the scale, force or weight can be measured electronically by measuring a change in, i.e., the conductivity or the voltage produced by the transducer. This measurement is then converted electronically into a readable format (e.g., meter or digital indicator).

However, conventional scales are limited to measuring force only in the direction of the weight of the object due to gravitational pull.

Various tools and specialty instruments are used in industry to measure force, traction, or tension. For example, in the case of torque, many different wrenches or suitable tools are currently available for different sized bolts, screws, or other fasteners. These measure torque directly by determining, in particular devices, how much the wrench bends or flexes as the bolt/screw is tightened. Unfortunately, these specialized tools are usually either expensive or relatively inaccurate due to the difficulty of accurately measuring how much the wrench bends. In any event. Each is normally very highly specialized so as to be applicable for only one or a very limited number of tasks.

What is needed, therefore, is a more reliable, universally applicable, and less costly approach to measuring various forces in three dimensions associated with traction, tension, or torque, whether such forces were applied to an object directly by human touch or through use of intermediate elements such as hand tools. What is even more particularly needed is an apparatus and method for directly and reliably measuring the forces applied to an infant during the birthing process.

SUMMARY OF THE INVENTION

The present invention provides an apparatus and method which solves the aforementioned problems associated with measuring forces applied to or exerted on an object by direct human touch or by application of intermediate elements such as tools and other implements. The invention is applicable in a wide variety of situations, For example, the invention is applicable in industrial applications to measure the force or torque that is applied to an object such as a nut or bolt using a tool. The invention is particularly applicable to measurement of the forces applied to a baby during delivery. As discussed above, the apparatus and method of the present invention will facilitate safer births and allow for studies relating to birth trauma, all of which may eventually lead to a decrease or even elimination of some forms of birth trauma.

The present invention also provides a novel force sensor which is particularly suitable for measuring force accurately in a single direction without error introduced as a result of extraneous forces in other directions. One, or more than one such force sensors in combination, is useful in the force measuring apparatus and method of the invention.

It is a fundamental of physics that for every action there is an equal and opposite reaction. The novel method and apparatus for measuring forces in accordance with the present invention does not rely upon measuring the forces where they are applied. Rather, the applied forces are measured at a location where the reaction occurs. Therefore, in accordance with a novel method of the invention, when the obstetrician is pulling on the baby, for example, the applied force is balanced by an equal and opposite reaction force that is applied through the feet of the obstetrician to whatever surface he or she is standing upon. Measurement of the reaction force will provide an accurate and reliable measurement of the force actually applied to the infant.

Similar situations and applications of the present invention may occur in industry. When a technician or mechanic is applying torque or adjusting tension/traction of an element, the reaction to this applied force will be balanced by an equal and opposite force applied through his feet onto the surface upon which he is standing. This means that, if a person is pulling or pushing on an object, the pulling or pushing force must be balanced at some point by an equal and opposite reaction force. If the person is standing, then that reaction force will appear at that person's feet, imposing a force upon the surface on which the person is standing. The apparatus and method of the present invention is adapted to measure these forces.

The apparatus and method of the present invention comprises transducers for measuring forces in three-dimensions as well as associated electronics for calculating in three-dimensions a resultant force vector which represents the force exerted on an object.

Further, an apparatus in accordance with the invention preferably comprises individual force sensors, each for making a measurement in a sole direction. Three such sensors arranged in mutually orthogonal orientations can be used to measure forces in each of three mutually orthogonal directions, thus measuring forces in three dimensions. Each force sensor may comprise elements constrained to move in a linear fashion, i.e., only along a single direction. The simplicity of such sensors allows them to be modular and, advantageously, allows them to be interchangeable, so that an individual platform can be calibrated for virtually any force range.

A preferred form of apparatus according to the invention may include a stable (i.e., immovable) platform, a movable platform, and intervening force sensors. An individual may stand on the movable platform during some procedure or function in order to measure forces applied to some object during the procedure.

An apparatus according to the invention need not be limited to a platform. Any structure or arrangement is suitable so long as it interfaces with and responds to a person performing a procedure, during which a force to be measured is applied, in such a manner as to react freely to the applied forces to provide a measurement of the reactive forces.

An apparatus in accordance with the invention may typically include a display or output device, which may take various forms, for providing to the operator an indication of the magnitude and/or direction of the force(s) being applied. The display or output device may be an alphanumeric display or a meter, some other sort of visual display, a light, or an audio device that emits one or more sounds or tones. Various types of alarms or auxiliary controls are also useful in a combination of elements according to the invention. For example, an alarm may be used to signal that an applied force has reached a level that represents an upper limit that could be applied safely in a certain situation (such as delivering a baby). A fixed output tone could represent a target force level, and a variable output tone could be used which changes with the applied force level. In this manner, the operator could listen to the audible output while concentrating on whatever task was at hand, rather than on a display, thus avoiding distraction.

The apparatus and method of the present invention has applicability a broad variety of situations, and may replace a variety of tools. For example, torque applied to a bolt or other component may be determined by measuring, with an apparatus according to the invention, the perpendicular force (Fp) applied to a lever-arm of known length (L) about an axis of rotation, e.g., a wrench handle, and calculating a torque (T) as the product of the applied perpendicular force (Fp) and lever-arm length, i.e., $T=F_p \times L$. The present invention will allow the tension, traction, pressure, torque, etc. to be measured in many situations without need for specialized tools previously required.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will be apparent.

BRIEF DESCRIPTION OF THE DRAWINGS

The features and advantages of the invention will be more readily understood upon consideration of the following detailed description of the invention, taken in conjunction with the accompanying drawings in which.

DETAILED DESCRIPTION OF THE PREFERRED EMBODIMENTS

Figure 1:
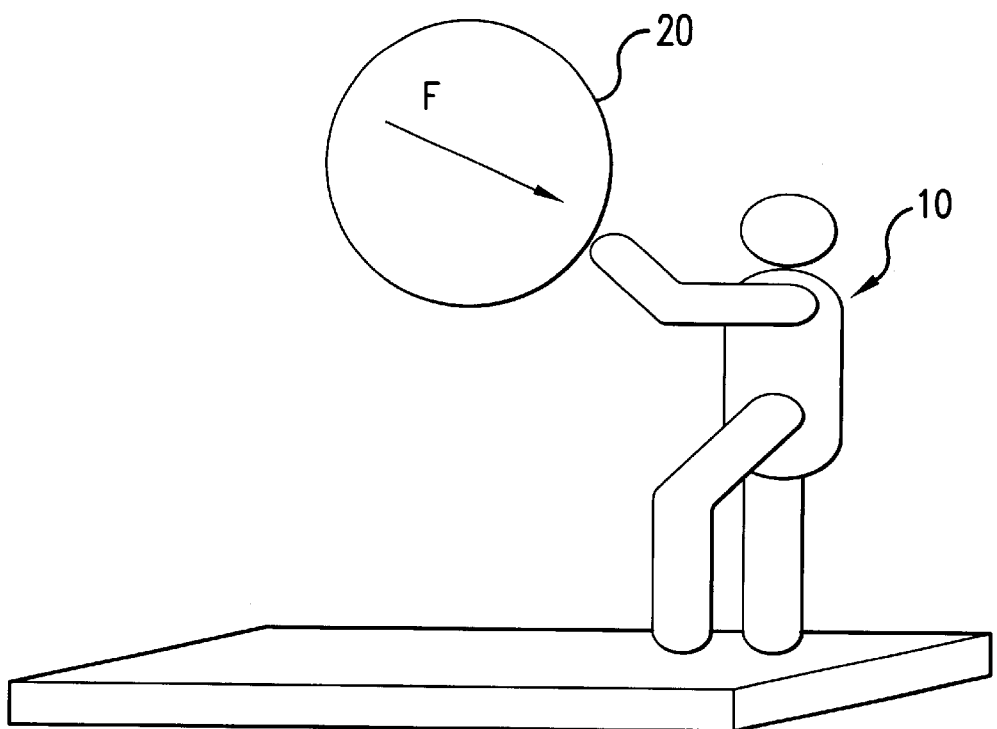
FIG. 1 is a schematic representation of how a person standing on a surface may apply a force (F) to an object.

Referring to FIG. 1, in the course of many and varied manual procedures, a person or individual 10 exerts a force (F) on an object 20. The person is normally standing on, for example, a floor 30.

Force (F) is understood to be a vector quantity having both a magnitude and an identifiable direction. Such a vector quantity can be resolved into its component parts in multiple coordinate axes, such as illustrated in FIG. 2A.

Figures 2A, 2B:
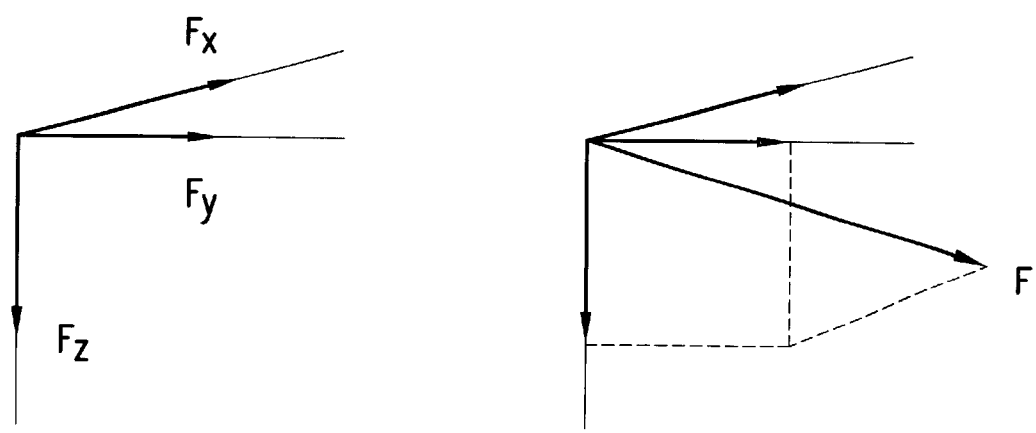
FIG. 2A illustrates the manner in which the applied force (F) may be resolved into its coordinate components and FIG. 2B shows force F as a resultant force vector.

Referring to FIG. 2A, force (F) can be resolved into three component parts extending along mutually orthogonal axes of a tree-dimensional coordinate system designated as the X, Y and Z axes, respectively. These components are considered to extend along the respective axes in the thus-defined coordinate system. Each component, $F_x$, $F_y$ and $F_z$, is of a magnitude which represents some portion of the magnitude of overall force (F). FIG. 2B illustrates graphically the manner in which force (F) is the resultant of its component parts.

Figure 3:
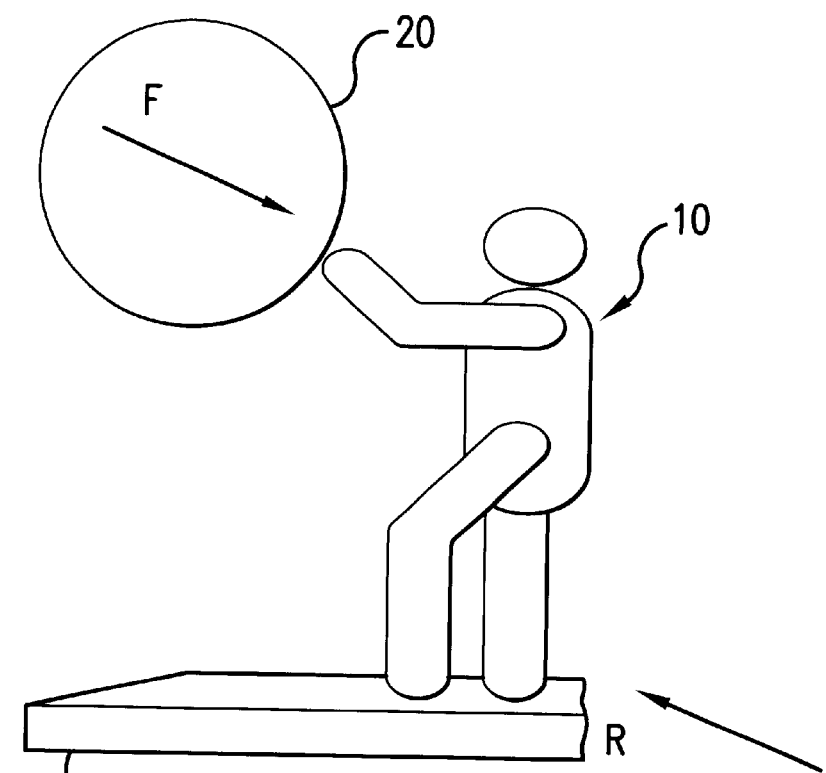
FIG. 3 is a schematic representation of how a reaction force (R) results from the application of force (F) depicted in FIG. 1.

Referring to FIG. 3, as individual 10 exerts force (F) upon object 20, a reaction force (R) results. Reaction force (R) is necessarily equal to and opposite to force (F). In the arrangement illustrated, with person 10 standing on floor 30, reaction force (R) is manifest at floor 30, the interface between the person and the floor. Reaction force (R) is applied by person 10 to floor 30 as a result of the fact that the person applies force (F) to object 20.

Figures 4A, 4B:
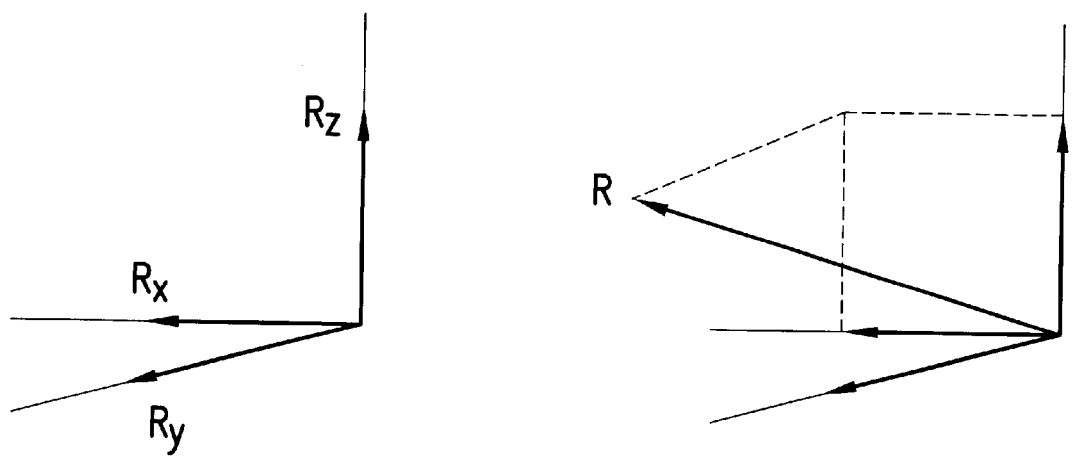
FIG. 4A illustrates the manner in which the reaction force (R) is resolved into its coordinate components and FIG. 4B shows R as a resultant force vector.

FIGS. 4A and 4B illustrate the manner in which reaction force (R) can be resolved into its component parts along the X, Y and Z axes. Just as reaction force (R) is equal and opposite to force (F), components $R_x$, $R_y$ and $R_z$ are equal and opposite to components $F_x$, $F_y$ and $F_z$, respectively.

Thus, in accordance with the present invention, a method and apparatus is provided for measuring reaction force components $R_x$, $R_y$ and $R_z$ in order to obtain a measurement of reaction force (R). Reaction force (R), being equal and opposite to force (F), is, thus, a proxy for force (F), measurement of which is desired.

Figure 5A:
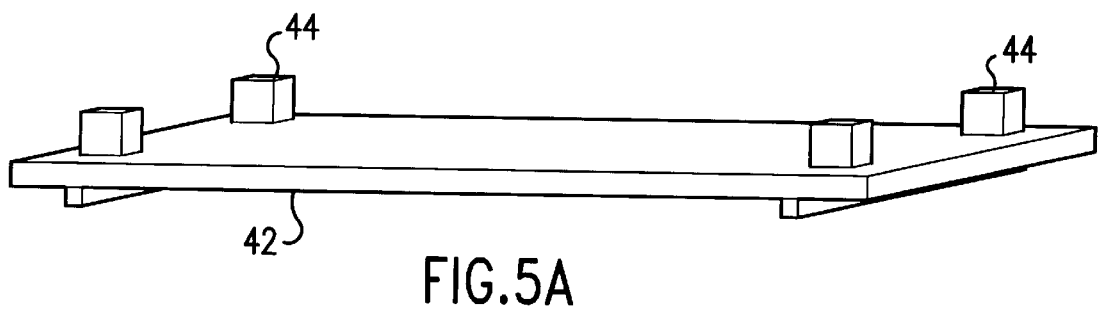
FIG. 5A illustrates several of the components of a force monitoring apparatus in accordance with a first embodiment of the present invention.
Figure 5B:
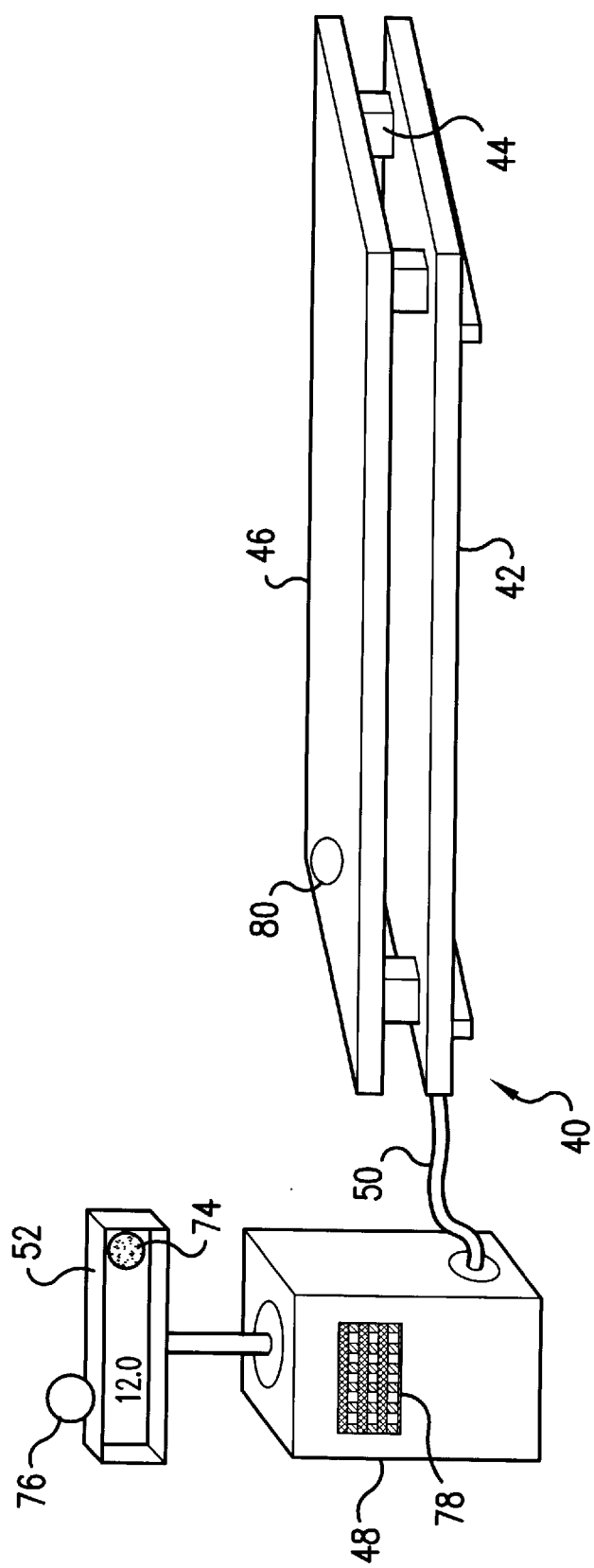
FIG. 5B is a more complete illustration of a force monitoring apparatus according to the embodiment of the invention as partially illustrated in FIG. 5A.

Referring to FIGS. 5A–5B, a first embodiment of an apparatus in accordance with the invention is illustrated. FIG. 5A is a partial illustration of the apparatus, while FIG. 5B is a more complete illustration.

In accordance with the present invention, an apparatus according to the invention, generally designated by reference numeral 40, comprises a base 42. The base is to be considered as "fixed" for the purpose of the present discussion. In this sense, the term "fixed" means that the base 42 is stable, providing a point of reference, and substantially immovable during use and operation of the apparatus.

One or more force sensor groups 44 are associated with base 42. Four such sensor groups are illustrated in FIGS. 5A–5B. However, the invention is not limited to any particular number, and could comprise more or less than four such groups. Each sensor group according to the invention must comprise elements capable of measuring forces in various directions as necessary for resolving and measuring the forces applied during use of the apparatus.

The reference to sensor "groups" should not be taken as limiting. What is important is that the apparatus comprise force sensors constructed and arranged to measure forces in a plurality of directions so as to measure the component forces necessary to obtaining a measurement of the reaction force R and the applied force F. These force sensors may be arranged as separate components or in some collective or unitary manner. They may be located in a single location on the apparatus or at different locations. Thus, the term "sensor groups" should not be considered as limiting, but is merely adopted for convenience of discussion.

A support 46 is also associated with the one or more force sensor groups 44. In the embodiment illustrated, support 46 comprises a platform. According to the invention, support 46 is movable relative to base 42. Optional springs or other suitable material may be interposed between base 42 and support 46 to counterbalance forces imposed on the support during use.

In accordance with the invention, the force sensors of the one or more force sensor groups 44 may include transducers which measure changes in properties in response to forces imposed thereupon. The strain gauges may be of the electrical type which exhibit varying resistance, varying capacitance, or variation in piezoelectric properties in response to stress and/or strain. These should be considered as exemplary, however, and the invention is not limited to force sensors of any particular type.

Apparatus 40 further comprises a computational device 48. In the illustrated embodiment computational device 48 is in the nature of an electronic computer or the like. Device 48 receives data from force sensors associated with the apparatus via a cable 50. Cable 50 is not strictly necessary, however, as the computational device 48 could receive data via a wireless connection.

Apparatus 40 may also desirably include a display 52, such as an alphanumeric display. Such a display can provide an indication of the force level applied at any time, force direction, etc., displaying such data in any desired format or units.

Figure 6:
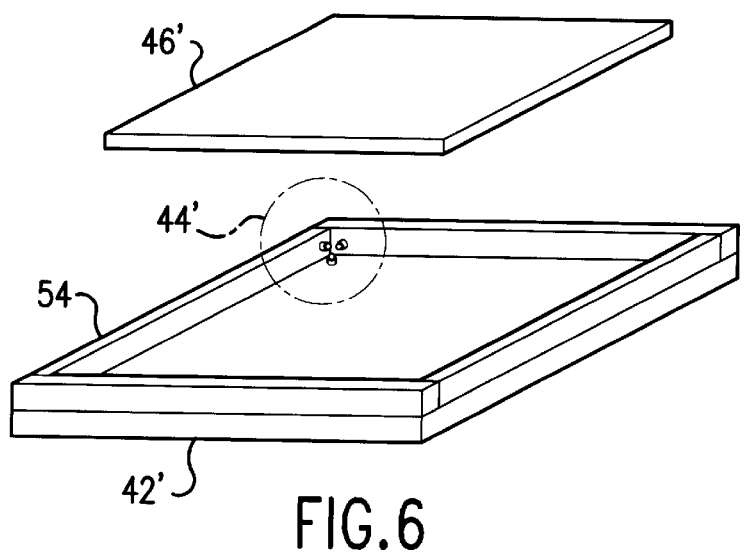
FIG. 6 illustrates an alternative embodiment of a platform assembly for a force monitoring apparatus according to the present invention.
Figure 6A:
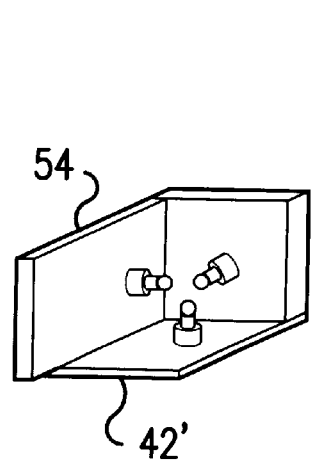
FIG. 6A illustrates in greater detail a portion of the platform assembly of FIG. 6.
Figure 6B:
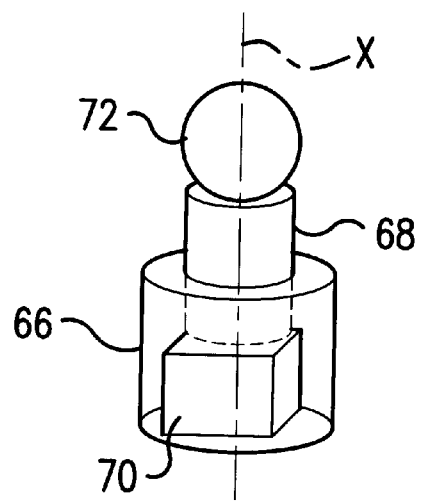
FIG. 6B illustrates an individual force sensor in accordance with the present invention.
Figure 6C:
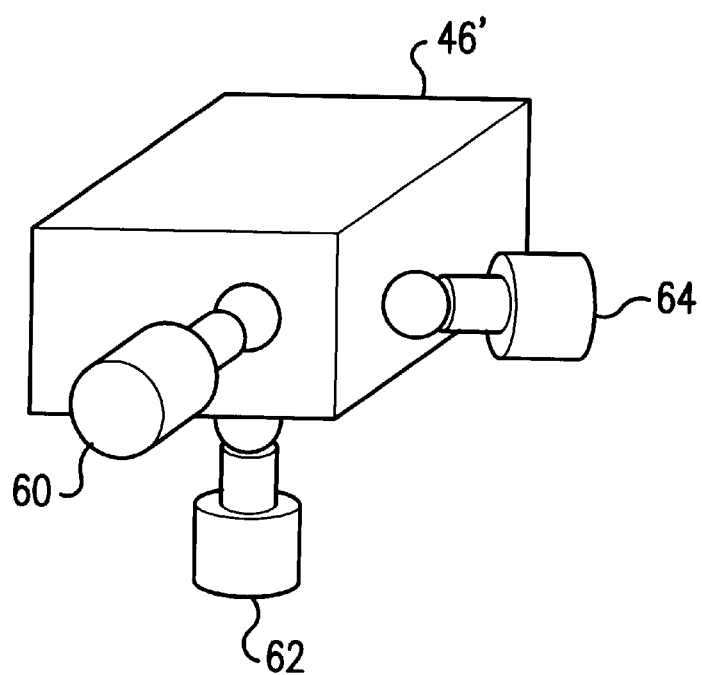
FIG. 6C is an illustration of how several force sensors according to the invention, as shown in FIG. 6B are used to measure forces in multiple directions.

An alternate and further specific embodiment of elements 42, 44 and 46 is illustrated in FIG. 6 of the drawings. Particular details thereof are also illustrated in FIGS. 6A–6C. In this alternate embodiment, base 42' is in the form of a tray having upturned peripheral walls 54. The support 46' is in the form of a plate or similar element. Support 46' rests within base 42' surrounded by walls 54.

The embodiment of FIG. 6 further includes at least one group of force sensors 44' (FIG. 6). Sensor group 44' is shown in greater detail in FIGS. 6A and 6C. Support 46' is supported within base 42' by the sensors of the one or more sensor groups 44'. The apparatus may also include springs or other resilient supporting elements interposed between the base 42' and support 46' to absorb forces applied to support 46'.

As seen in FIGS. 6A and 6C, in the apparatus illustrated in FIG. 6, each sensor group 44' comprises three force sensors, 60, 62 and 64. These are supported so as to extend along three mutually orthogonal axes.

Each force sensor includes a first portion 66. In the illustrated embodiment of the apparatus, first portion 66 of the respective sensors can be mounted on the lowermost portion of base 42' and on the upturned peripheral walls 54, respectively.

Each sensor further includes a second portion 68 (FIG. 6B) which is movable within first portion 66. In the exemplary embodiment illustrated, second portion 68 may be slideable within first portion 66. The configuration of the sensor illustrated in FIG. 6B defines, generally, an axis X for the device. Sliding movement of the second portion with respect to the first portion is along axis X.

A transducer 70 is associated with first and second portions 66 and 68 in such manner that relative movement of the first and second portions imposes stress and/or strain upon transducer 70. Transducer 70 may be a strain gauge, a piezoelectric device, or any other device which exhibits a change in properties as a result of stress or strain imposed thereupon.

In accordance with the invention, each sensor further includes a roller or ball 72 mounted on the end of second portion 68. This roller may be a ball and socket type device. Ball 72 of each sensor is in contact with support 46' in the apparatus illustrated in FIG. 6. As a result, any force transferred from support 46' to the sensor which is parallel to the axis X of first and second parts 66, 68 will tend to impart relative axial movement between the first and second parts, resulting in a measurable reaction in transducer 70. Transducer 70 can, thus, provide an indication of the force along the axis X of the force sensor. However, rolling action of ball 72 will substantially prevent transmission of any forces from support 46' to the force sensor in any direction lateral to axis X. Consequently, each force sensor measures forces only in the direction of its axis, as illustrated in FIG. 6B.

A combination of three sensors positioned along three mutually orthogonal axes, as illustrated in FIGS. 6A and 6C, provides simultaneous, independent measurements of forces in three mutually orthogonal directions. These directions can be considered to correspond to the X, Y and Z axes of a coordinate system.

In the embodiment of the apparatus illustrated in FIG. 6, a set of force sensors 44' is desirably provided at each corner of base 42'. Thus, such an apparatus would comprise four groups of sensors. However, the invention is not limited to an apparatus comprising four groups of sensors. A smaller or greater number of sensors may be provided for measuring forces depending upon the particular intended application or use of the apparatus.

Output from the force sensors of sensor groups 44 (FIGS. 5A–5B) or 44' (FIGS. 6–6C) is connected to computational device 48 so that measured forces can be input and total forces calculated. Generally, it is desirable to calculate a total force in each direction corresponding to the X, Y and Z axes of the coordinate system. In this way, force components $R_x$, $R_y$ and $R_z$ can be calculated and the total resultant force (R) can be determined in the manner described above with reference to FIGS. 4A–4B.

Referring to the embodiment of FIG. 6 as an example, and assuming that such embodiment comprises four groups 44' of force sensors, the apparatus would comprise four sensors extending along each of the X, Y and Z coordinate directions. The output signals of each force sensor will be provided to computational device 48. The four individual signals representing measurements along each of the X, Y and Z axes, respectively, will be totaled to yield an algebraic sum of forces acting along each coordinate direction. These totals, during use of the apparatus, correspond to the reaction force components $R_x$, $R_y$ and $R_z$ imposed upon support 46 or 46' by an individual standing upon the support and exerting a force (F) upon some external object. Based upon the force components $R_x$, $R_y$ and $R_z$, the magnitude and direction of a resultant force (R) can be determined utilizing known trigonometric relationships. Inasmuch as the respective components of force (F), and force (F) itself, are equal and opposite to the components of force (R) and force (R) itself, measurement of reaction force (R) and its components provides an accurate measurement by proxy of force (F).

Figure 7:
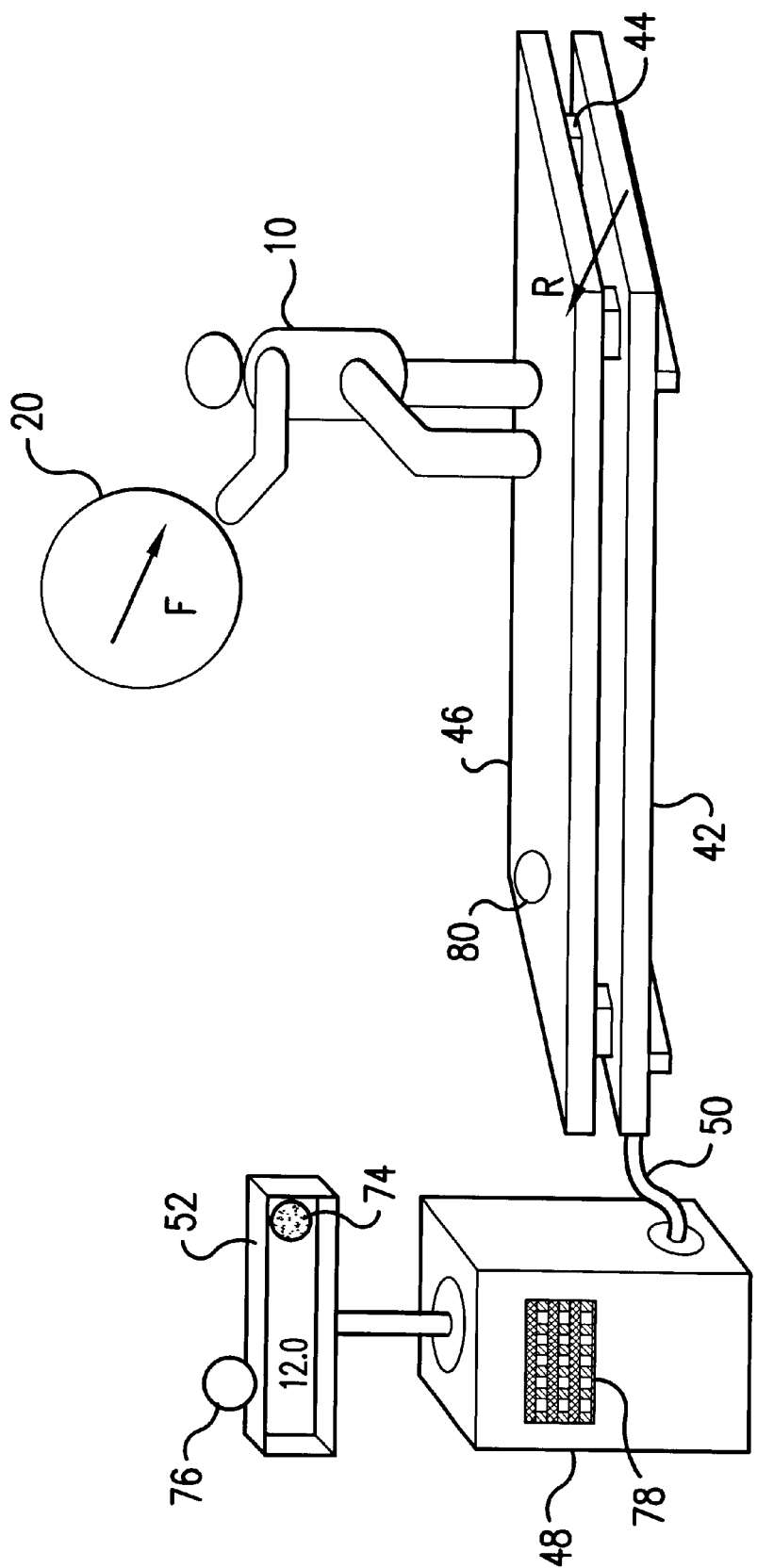
FIG. 7 is a schematic representation of the manner in which an apparatus of the present invention may be utilized.

By way of further explanation, reference is made to FIG. 7 which illustrates an exemplary manner of use of the embodiment of FIGS. 5A–5B. Although described with reference to that embodiment, the mode of operation is equally applicable to the embodiment of FIGS. 6–6C or any other variation of apparatus in accordance with the present invention.

As illustrated in FIG. 7, a person 10 stands on support 46 while applying a force (F) to object 20. As a result of application of the force to the object, an equal and opposite reaction force (R) is manifest at the interface of the feet of the individual and support 46. This reaction force, imposed upon support 46, is measured by the sensors of the one or more sensor groups 44, as described above. The plurality of measurements in the respective coordinate directions are input to computational device 48. Computational device 48 then calculates the magnitude of the resultant force components and the resultant force which, necessarily, equals the magnitude of force (F) applied to the object 20. Computational device 48 may also calculate the actual direction of force (R) which, necessarily, is opposite to the direction of force (F).

Results may be displayed by the display 52. Display 52 may present information in any format desired and may indicate, for example, the total magnitude of the force, force direction, and/or individual force components should such information be useful.

In accordance with the invention, the apparatus may further comprise one or more audio output devices 74 for providing audible signals to an operator. Such audible signals may be less distracting than visual output, not requiring the operator to divert attention from the task at hand in order to observe alphanumeric information on display 52.

Various forms of audible output may be utilized in accordance with the invention. For example, a single tone may be output when the force reaches some desired threshold, or a single tone may be output as an alarm that some limit has been reached or exceeded. A plurality of different tones can be output to signal different conditions. A changing tone may be output to provide audible feedback to an operator, for example, as the magnitude of force increases or decreases. These suggestions should not be considered as limiting. Any form of audible output that is found to be useful to an operator may be utilized in accordance with the invention.

Further, a device according to the invention can comprise a signal light 76. This signal light can be used to signal an alarm and/or the fact that some threshold force has been attained. The signal light can be used to alert an operator to any other condition or situation that may be of significance during use of the apparatus.

In accordance with the invention, computational device 48 may further comprise a control panel 78. The nature and purpose of control panel 78 will be described in greater detail hereinafter.

In accordance with the present invention, an apparatus as described above is advantageously used for measuring the force exerted by an obstetrician on a baby during delivery. The obstetrician would stand on a support such as 46 or 46' during the birthing process. As it becomes necessary for the obstetrician to apply manipulative force to the infant, corresponding to object 20, an apparatus in accordance with the invention would provide real time output of the magnitude of the force as it is applied. Thus, the obstetrician has immediate and accurate feedback, enabling the obstetrician to reliably avoid application of excessive force to the infant. Injury can thus be reduced substantially or avoided entirely in a safe and reliable manner.

The embodiments of the invention described, above each comprise transducers and force sensors for detecting and measuring forces in three mutually orthogonal directions. This is certainly desirable when the force to be measured might be directed in any direction. However, the invention is not limited in this manner. For example, if an object is constrained to move in a single direction, or in a limited range of directions, in response to applied force, or if an object is constrained to pivot about a fixed axis in response to applied forces, measurement of force components in certain other directions may be of no interest or consequence. In such a situation, an apparatus according to the present invention might include force sensors for measuring forces in less than three dimensions, measuring forces only in directions of interest or of consequence.

By way of particular example, a person standing on a support 46 as described above may be exerting force upon an object that is constrained to move in two dimensions. In that event, there may be little or no interest in any force component along a third axis of orientation which is perpendicular to the two dimensions of possible movement inasmuch as forces in that third direction can impart no motion. In that situation, an apparatus according to the invention may provide sufficient information to an operator if it detects and measures forces acting in only the two dimensions of interest.

The control panel 78 may include, for example, a keyboard and various switches for controlling the operation of the apparatus. One or more output ports may be provided to facilitate connection to an external auxiliary device, such as a printer, memory, or other device for utilizing information provided by computational device 48. If an apparatus in accordance with the invention is utilized in childbirth, it may be desirable to connect a fetal monitor to the apparatus so as to provide appropriate information and/or a permanent record relevant to the birthing process.

Control switches need not be limited in placement to the control panel. Support 46 or 46' may comprise one or more switches 80 (FIG. 7) in the form of a foot switch or any other suitable form. This may be used to remotely control computational device 48 for such functions as resetting or calibrating the apparatus. Switch 80 may be connected to device 48 by cable 50 or by a wireless connection. The structure and purpose of a switch such as illustrated at 80 in FIG. 7 may be expanded to constitute a multi-functional remote control having the capability of performing a wide variety of control and input functions and easily accessible by an operator while standing on support 46 or 46', possibly out of reach of control panel 78.

In operation of the apparatus, an operator 10 steps on support 46 or 46'. The weight of the operator imposes upon the transducers measuring forces in the "vertical" direction forces totaling the weight of the operator. By operation of switch 80 or any other suitable actuating means, the apparatus will be caused to calibrate itself, identifying this condition (with the operator standing on the support) as the "zero exerted force" condition. Thereafter, as the operator applies a force to an external object, any additional forces or any change in the forces measured by the apparatus of the invention would be considered as components of the reaction force (R) in response to the applied force (F).

The apparatus as described can be recalibrated as necessary. This might become necessary, for example, if the operator is required to pick up and use, in the application of force, an additional implement or object. For example, an obstetrician may be required to lift a pair of forceps to assist in the delivery. By holding the forceps in his or her hands, the obstetrician increases his or her apparent weight. This would call for the apparatus to be recalibrated to obtain a new reading for the zero exerted force condition. Alternatively, it may be necessary for a second individual to step onto the support 46 to assist the obstetrician. Again, recalibration would be necessary to provide a new baseline for measurement of the reaction force.

An apparatus in accordance with the invention can also be used in a weightless environment. In that situation, no subtraction of the weight of the individual 10 would be necessary for calibration.

The foregoing description assumes that the base 42 and support 46 are in a horizontal orientation whereby the initial weight of the operator on support 46 is manifest solely in measurements by those force sensors which measure vertical forces. It is possible, of course, that an apparatus according to the invention could be used, intentionally or unintentionally, with the base and support in an orientation that deviates from the horizontal. Proper use and results can be accomplished in at least two ways.

First, a position sensor (not shown) may be provided to supply to computational device 48 one or more signals representing the orientation of the apparatus. Such a position sensor could be, for example, a known mercury switch type level sensor, a gyroscopic type sensor, or any other suitable device. The computational device 48 may then extract the vertical force component, as well as both horizontal force components, taking into account the information from the position sensor, in order to reference all measurements to a common orientation.

Alternatively, if the base 42 and support 46 are in an orientation which deviates from the horizontal, then the weight of an operator simply standing on support 46 will result in force or strain measurements in the force sensors oriented in more than one direction. The apparatus may be calibrated in substantially the same manner as described above when the support is oriented horizontally and the weight of the operator results in force or strain measurements in only a single direction. However, when the support is not horizontal, the weight of the operator will result in non-zero force readings in more than one direction. Each of these must be "zeroed out" or canceled out from subsequent measurements in order to obtain accurate readings of the components of the reactive force (R).

Force measurement calculations and provision of data output may be performed in accordance with the present invention any time a measurable force appears in one of the force sensors. The display or other output of information concerning measured force can be provided in any manner suitable to the operator and/or suitable to the function to which the apparatus is applied. For example, the magnitude of the applied force can be updated periodically, such as at a rate of 2–4 times per second. Through the use of external recording devices, it is possible to graph the reaction force (R), and thus the applied force (F) with respect to time. An electronic record can also be created by any suitable means.

Figure 8:
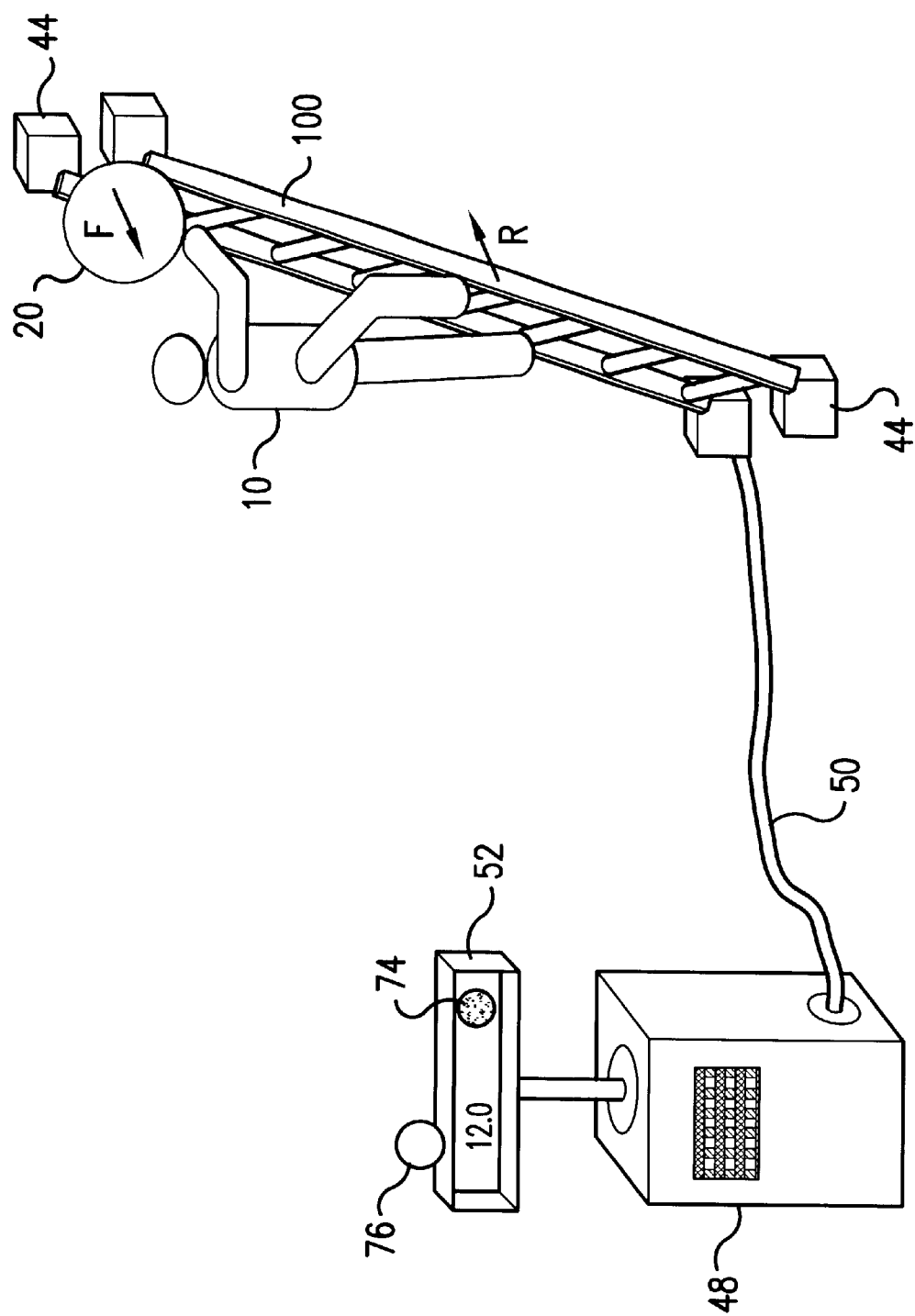
FIG. 8 illustrates an alternative embodiment of an apparatus in accordance with the present invention.

FIG. 8 illustrates a further embodiment of an apparatus according to the present invention. Elements of the apparatus in FIG. 8 corresponding to elements of the apparatus in previously-described figures are identified by similar reference numerals.

In the embodiment of FIG. 8, the base and support are replaced by a ladder 100 upon which an operator 10 may stand while applying a force (F) to an object 20. One or more groups of force sensors 44 can be placed at appropriate positions in association with ladder 100. In the illustrated example, force sensors are provided where the ladder rests, at its base, upon a generally horizontal surface and where the ladder leans, at its upper portion, against a generally vertical surface. When a person occupies the ladder, the weight of the person will result in an initial set of forces which will be measured by the sensors associated with the one or more groups of sensors 44. The apparatus may then be calibrated, as discussed above, to establish a zero exerted force condition. Thereafter, when operator 10 applies a force (F) to an object 20, a reaction force (R) results. Reaction force (R) is transmitted to the ladder from the person at each point where the person 10 is in contact with the ladder with his or her feet, hands, or other portions of the body. The components of the reaction force may be measured, and the magnitude and direction of the reaction force may be determined, as discussed previously. This provides an accurate and reliable real time measurement of the exerted force (F).

An apparatus in accordance with the present invention is not limited to a platform-type support or to a ladder, as has been illustrated. A support for one or more operators may comprise, for example, a chair, a harness, or any other construction capable of supporting the operator(s) and responding to reaction forces in the manner described.

An apparatus according to the invention may be embodied in a pair of shoes which may be worn by an operator. Shoes represent, generally, individual platform-type supports such as depicted in FIGS. 5A–5B, 6 and 7. Since the individual wearing such shoes could readily and arbitrarily reposition each shoe during use of the apparatus, suitable position sensing means or repeated calibration would be necessary to maintain accurate measurements each time the position of each shoe was shifted, and it would normally be necessary to total the output from both shoes to obtain complete data.

In the course of performing certain operations, a person standing on a support, as previously described, may have a need to brace himself due to the difficult nature of the operation being performed. The force of any such bracing must also be accounted for in the response force calculations. Therefore, the present invention further contemplates provision of, for example, a hand or foot brace, in addition to support 46, 46' or 100 as described above. Such additional hand or foot brace must also include appropriate force sensors so that any reactive forces applied at the hand or foot brace can be measured, provided to computational device 48, and taken into proper account in calculating the applied force.

The apparatus and method according to the present invention is applicable in a broad variety of situations where measuring a force is necessary. For example, it is common, when applying bolts securing an object, that the bolts must be tightened with a precise force or torque. Various torque-measuring wrenches are available, many of which are expensive and/or highly specialized in their utility. According to the present invention, a mechanic tightening bolts may be positioned on a support as described above with respect to the present invention. When the mechanic applies a force to the handle of a wrench, the magnitude of the force can be readily determined by measuring the reaction force in the manner described above in accordance with the present invention. If the length of the wrench handle is known, then the torque applied to the bolt, measured in foot-pounds, can be easily determined by multiplying the applied force times the length of the wrench handle. In such an application, audio tones could be advantageously used to guide the mechanic. A first tone representative of the desired torque may be sounded continuously. A second tone, which varies as the bolt is tightened, could be sounded simultaneously. When the two tones are matched, the operator will know that the bolt is tightened to the appropriate level of torque.

The invention being thus described, it will be obvious that both the method and the apparatus according to the present invention may be varied in many ways within the scope of the appended claims.

What is claimed is:

1. An apparatus for monitoring the application of a force exerted upon an object by a person, comprising:

a support for a person applying a force upon an object;

sensors in operative contact with said support for measuring the constituent components of a force acting upon the support;

wherein said sensors detect changes in the force components applied to the support in response to a force exerted upon an object by a person on said support;

means for calculating the change in the magnitude of the force applied to the support by a person on said support in response to exertion by the person of a force upon an object based upon changes in said force components; and output means for providing an indication of the force applied to the object by the person based upon the changes in the force components applied to the support in response to the force exerted upon the object.

2. The apparatus of claim 1, wherein the support is a platform.

3. The apparatus of claim 2, wherein said sensors comprise a plurality of sensors arranged on a periphery of the platform.

4. The apparatus of claim 1, wherein said calculating means comprises an electronic unit operatively connected to said sensors for computing the force applied to an object by the person.

5. The apparatus of claim 1, wherein said output means provides a visual indication of the force applied to the object by the person.

6. The apparatus of claim 1, wherein the output means provides an audible indication of the force applied to the object by the person.

7. The apparatus of claim 6, wherein the audible indication of the force applied to the object by the person includes at least two different audio tones.

8. The apparatus of claim 6, wherein the audible indication includes at least one variable tone.

9. The apparatus of claim 1, wherein said sensors include three sensors arranged to measure forces exerted on the support in three mutually orthogonal directions.

10. The apparatus of claim 1, wherein said apparatus comprises a fixed base, and each sensor includes:

a first portion associated with said fixed base for the apparatus;

a second portion movable relative to said first portion;

a strain transducer in operative association with said first and second portions for measuring force applied to said sensor;

a roller associated with an exposed end of said second portion;

wherein said roller contacts a portion of the support so as to apply a unidirectional force via said roller and said second portion to the strain transducer.

11. The apparatus of claim 1, wherein said means for calculating calculates the direction of the force applied to the support by a person on said support in response to exertion by the person of a force upon an object based upon changes in said force components;

wherein the direction of the force applied to the support represents the direction of the force applied to the object by the person.

12. The apparatus of claim 1, wherein said object is an infant during the birthing process and said apparatus measures the force applied to said infant during birth.

13. The apparatus of claim 1, wherein the force components detected by said sensors are provided to said means for calculating by a wireless connection.

14. The apparatus of claim 1, wherein the weight of the person is zeroed-out upon calibration of the apparatus such that said change in magnitude of the force is based on additional forces on the support measured in response to said force applied to the object by the person.

15. The apparatus of claim 1, wherein said apparatus comprises a fixed base, and each sensor includes:

a first portion associated with said fixed base for the apparatus;

a second portion movable relative to said first portion and responsive to a force in a single direction; and a strain transducer in operative association with said first and second portions for measuring force applied to said sensor in said single direction.

16. An apparatus for monitoring the application of a force exerted upon an infant during childbirth by a person, comprising:

a support for a person applying a force upon an infant;

sensors in operative contact with said support for measuring the constituent components of a force acting upon the support;

wherein said sensors detect changes in the force components applied to the support in response to a force exerted upon the infant by a person on said support;

means for calculating the change in the magnitude of the force applied to the support by a person on said support in response to exertion by the person of a force upon the infant based upon changes in said force components;

wherein the change in magnitude of the force applied to the support represents the force applied to the infant by the person.

17. A force sensor for measuring in a single direction a force applied to a machine element, comprising:

a first sensor portion and a second sensor portion movable relative to said first sensor portion;

a strain transducer in operative association with said first and second sensor portions for measuring force applied to said sensor;

said first sensor portion being supported by a part of the machine that is movable relative to the machine element;

said second sensor portion having a roller element associated therewith;

wherein said roller contacts the machine element so as to transmit via said roller element a unidirectional force to said second portion and to the strain transducer.

18. A force sensor as in claim 17, wherein said machine element is a support for a person, and said sensor measures a force applied to said support in a single direction.

19. A combination as in claim 18, comprising at least two of said sensors arranged in different directions for measuring forces acting upon said support in said at least two directions.

20. A combination as in claim 18, comprising at least three of said sensors arranged in mutually orthogonal directions for measuring forces acting upon said support in three mutually orthogonal directions.

21. A combination as in claim 20, further comprising means for calculating a resultant force based upon the forces measured by said at least three sensors.

22. A method for monitoring the application of a force upon an object by a person, comprising providing a support for the person;

providing at least one sensor for measuring forces applied to the support;

measuring a force applied to the support in response to application of a force to the object by the person as a representation of the force applied to the object and providing a perceptible indication of the force applied to the object by the person based upon the changes in the forces applied to the support in response to the force exerted upon the object.

23. A method as in claim 22, comprising measuring the forces applied to the platform in a plurality of directions in response to application of a force to the object by the person.

24. A method as in claim 23, comprising measuring the forces applied to the platform in three mutually orthogonal directions in response to application of a force to the object by the person.

25. A method as in claim 24, further comprising calculating the magnitude of the force applied to the object based upon the forces measured in said three directions.

26. A method as in claim 25, further comprising calculating the direction of the force applied to the object based upon the forces measured in said three directions.

27. A method as in claim 25, wherein said object is an infant in the birthing process and said method measures the force applied to the infant by a person during said birthing process.

28. An apparatus for monitoring the application of a force exerted upon an object by a person, comprising:

a support for a person applying a force upon an object;

sensors in operative contact with said support for measuring the constituent components of a reaction force acting upon the support;

wherein said sensors detect changes in the reaction force components applied to the support in response to the force exerted upon an object by a person on said support;

means for calculating the change in magnitude of the force exerted on an object by the person based upon changes in said components of the reaction force applied to the support by a person on said support; and means for outputting an indication of the calculated change in magnitude of the force exerted on the object by the person.

29. The apparatus of claim 28, wherein said means for calculating calculates the direction of the force exerted by the person upon an object based upon changes in said force components of the reaction force applied to the support by a person on said support.

30. A method for monitoring the application of a force upon an object by a person, comprising providing a support for the person;

providing at least one sensor for measuring reaction forces applied to the support;

calculating the change in magnitude of the force exerted on an object by the person based upon changes in said components of the reaction force applied to the support by a person on said support; and outputting an indication of the calculated change in magnitude of the force exerted on the object by the person.

31. An apparatus for monitoring the application of a force exerted upon an object by a person, comprising:

at least two sensors for measuring the constituent components of a reaction force;

wherein said sensors detect changes in the reaction force components in response to a force exerted upon an object by a person;

means for calculating the change in magnitude of the force exerted on an object by the person based upon changes in said components of the reaction force; and means for outputting an indication of the calculated change in magnitude of the force exerted on the object by the person.

32. The apparatus of claim 31, wherein said sensors include three sensors arranged to measure forces exerted in three mutually orthogonal directions.

33. The apparatus of claim 31, wherein said sensors are associated with a ladder, and said sensors detect changes in the reaction force components applied to the ladder in response to said force exerted upon an object by a person on said ladder.

34. The apparatus of claim 31, wherein said sensors are associated with a seat, and said sensors detect changes in the reaction force components applied to the seat in response to said force exerted upon an object by a person on said seat.

35. The apparatus of claim 31, wherein said sensors are associated with a harness, and said sensors detect changes in the reaction force components applied to the harness in response to said force exerted upon an object by a person wearing said harness.

36. The apparatus of claim 31, wherein said sensors are in operative contact with a shoe worn by the person, and said sensors detect changes in the reaction force components applied to said shoe in response to said force exerted upon an object by the person wearing said shoe, and wherein the means for calculating calculates a total of the corresponding reaction force components obtained from said shoe.

37. The apparatus of claim 31, wherein one or more sensors are associated with a brace bracing the person, and said one or more sensors associated with the brace detect changes in the reaction force applied at the brace in response to said force exerted upon an object by the person, and wherein said reaction force applied at the brace is provided to said means for calculating.

38. The apparatus of claim 31, further comprising means for calculating the direction of the force exerted on an object by the person based upon changes in said components of the reaction force.

39. A force sensor for measuring in a single direction a force applied to a machine element, comprising:

a first sensor portion;

a second sensor portion responsive to forces in a single direction movable relative to said first sensor portion;

a strain transducer in operative association with said first and second sensor portions for measuring force applied to said sensor in said single direction;

said first sensor portion being supported by a part of the machine that is movable relative to the machine element;

wherein said second sensor portion contacts the machine element so as to transmit a unidirectional force in said single direction to the strain transducer.

40. A combination as in claim 39, comprising at least two of said sensors arranged in different directions for measuring forces acting in said at least two directions.

41. A combination as in claim 39, comprising at least three of said sensors arranged in mutually orthogonal directions for measuring forces in three mutually orthogonal directions.

* * * * *